United States Patent
Urata

(10) Patent No.: US 7,667,913 B2
(45) Date of Patent: Feb. 23, 2010

(54) CONTROL UNIT, STORAGE UNIT, AND METHOD FOR MANUFACTURING STORAGE UNIT

(75) Inventor: Yukio Urata, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 0 days.

(21) Appl. No.: 12/107,411

(22) Filed: Apr. 22, 2008

(65) Prior Publication Data

US 2008/0310045 A1 Dec. 18, 2008

(30) Foreign Application Priority Data

Jun. 15, 2007 (JP) ............... 2007-159325

(51) Int. Cl.
*G11B 5/02* (2006.01)
(52) U.S. Cl. ....................................... 360/59
(58) Field of Classification Search .................. 360/75, 360/59, 77.04

See application file for complete search history.

(56) References Cited

U.S. PATENT DOCUMENTS

| | | | | |
|---|---|---|---|---|
| 7,239,471 B2 * | 7/2007 | Tanabe | ................ | 360/75 |
| 7,430,090 B2 * | 9/2008 | Oyamada et al. | ............... | 360/75 |
| 7,483,234 B2 * | 1/2009 | Shimozato | .................... | 360/75 |
| 7,492,543 B2 * | 2/2009 | Mitsunaga et al. | ............ | 360/75 |
| 7,508,618 B1 * | 3/2009 | Herbst et al. | ................... | 360/75 |
| 2006/0119974 A1 | 6/2006 | Yamazaki et al. | | |
| 2007/0230015 A1 * | 10/2007 | Yamashita et al. | ............ | 360/75 |
| 2008/0023468 A1 * | 1/2008 | Aoki et al. | ................... | 219/655 |
| 2008/0204923 A1 * | 8/2008 | Yoon | ........................... | 360/75 |
| 2008/0247073 A1 * | 10/2008 | Park | ........................... | 360/59 |

FOREIGN PATENT DOCUMENTS

| | | |
|---|---|---|
| JP | 2006-164388 | 6/2006 |
| JP | 2007-42239 | 2/2007 |
| KR | 10-2006-0075126 | 7/2006 |

* cited by examiner

*Primary Examiner*—Fred Tzeng
(74) *Attorney, Agent, or Firm*—Greer, Burns & Crain, Ltd.

(57) ABSTRACT

A control unit adjusts spacing between a head with a heater and a storage medium of a storage unit by controlling the power of the heater. The control unit measures first values of touchdown heater power at a first temperature set as the temperature condition. And the control unit estimates second values of the touchdown heater power at a temperature other than the first temperature set on the measurement of the first values, on the basis of a conversion equation. And the control unit determines heater power setting values to adjust the spacing between the head and the storage medium, for each of the sub-areas, on the basis of the first values and the second values.

9 Claims, 9 Drawing Sheets

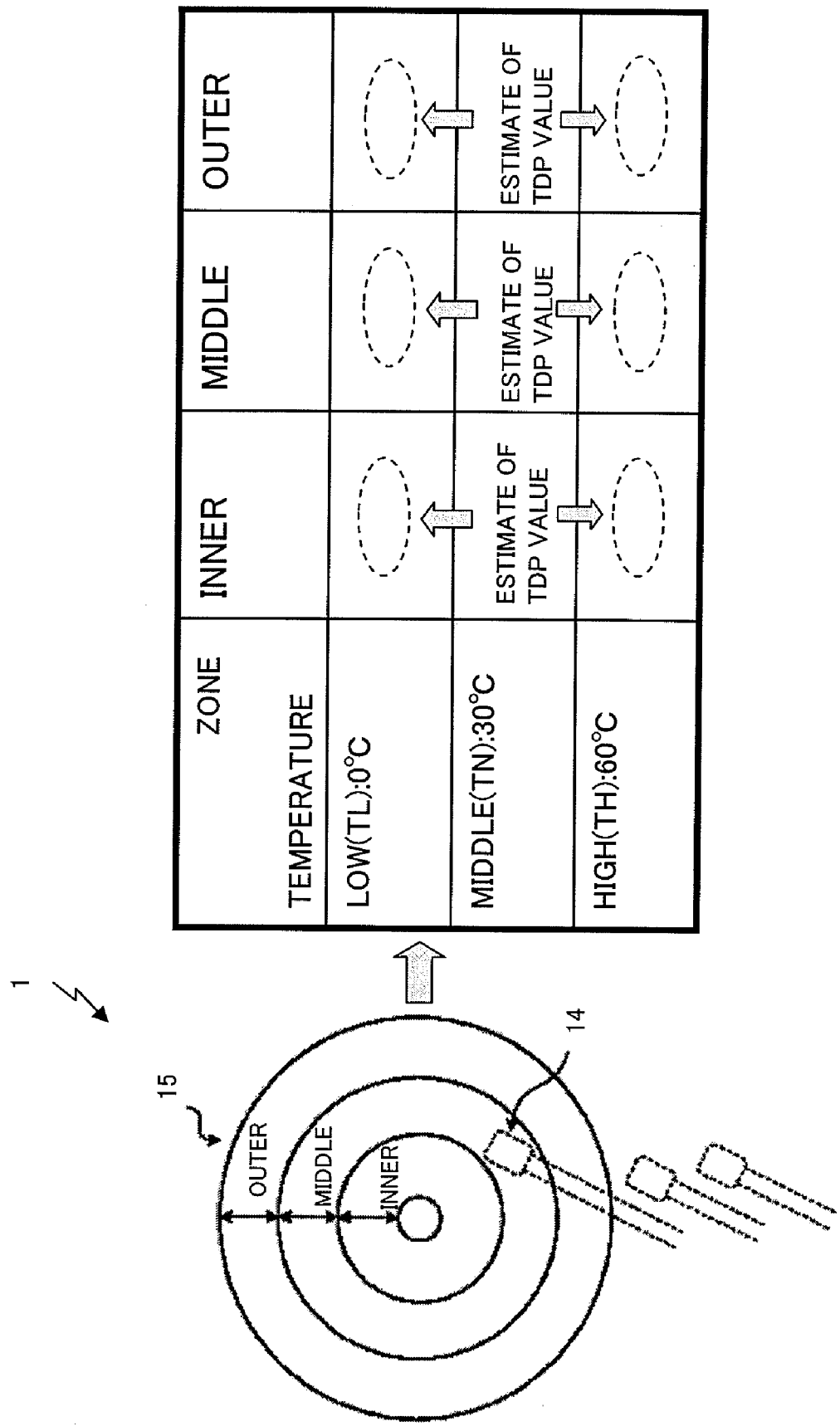

FIG.4

| SETTING VALUE TABLE OF HEATER ||||
|---|---|---|---|
| ZONE / TEMPERATURE | INNER | MIDDLE | OUTER |
| LOW(TL):0°C | 130(mw) | 110(mw) | 90(mw) |
| MIDDLE(TN):30°C | 100(mw) | 80(mw) | 60(mw) |
| HIGH(TH):60°C | 70(mw) | 50(mw) | 30(mw) |

FIG.5

Touch Down Power(Target Temp.) = Slope * Touch Down Power(Base Temp.) + Base
If Touch Down Power(Target Temp.)<0, Touch Down Power(Target Temp.)=FFh
If Touch Down Power(Target Temp.)>Max.Clip, Touch Down Power(Target Temp.)=Max.Clip Slope, Base : 2's complement, Q8 Format

FIG.6

ΔBase = Touch Down Power(Target Temp., Target Area) – Slope * Touch Down Power(Base Temp., Target Area)
 – Base(Target Area)

Slope, Base : 2's complement, Q8 Format

FIG.9

Touch Down Power(Target Temp.) = TDP1 + (TDP2 − TDP1)/(Temp2 − Temp1) * (TargetTemp − Temp1)
If Touch Down Power(Target Temp.)<0, Touch Down Power(Target Temp.)=FFh
If Touch Down Power(Target Temp.)>Max.Clip, Touch Down Power(Target Temp.)=Max.Clip Slope Check = (TDP2 − TDP1)/(Temp2 − Temp1)

FIG.10

Touch Down Power(Target Temp.) = TDPc + (TDPs − TDPc)/($\alpha$ + $\beta$) * $\beta$
If Touch Down Power(Target Temp.)<0, Touch Down Power(Target Temp.)=FFh
If Touch Down Power(Target Temp.)>Max.Clip, Touch Down Power(Target Temp.)=Max.Clip

CONTROL UNIT, STORAGE UNIT, AND METHOD FOR MANUFACTURING STORAGE UNIT

BACKGROUND

1. Field of the Technique

The present technique relates to a control unit for a storage unit that determines a heater setting value for adjusting the spacing between a storage medium and a head.

2. Description of the Related Art

A known technique exists in a magnetic disk unit for keeping a constant distance between a disk and a head by adjusting the spacing for the head in a manner that depends on the temperature in the magnetic disk unit.

In the magnetic disk unit, before the product is shipped, a heater setting value for adjusting the spacing is predetermined for each mounted head, each position on a medium such as a disk, and each temperature in the unit. In this case, a technique exists, for determining a heater setting value using an output value measured when the head and the disk are put in contact with each other (touchdown), i.e., the value of what is called a touchdown heater power (TDP).

However, in the technique for determining a heater setting value using the value of the TDP, a problem exists in that the probability that, for example, a head or a medium is damaged is high.

Specifically, at least, the head and the storage medium need to be put in contact with each other to measure the TDP. Thus, when the TDP is measured for each position on the storage medium such as a disk above which the head floats and each temperature in the unit, since the number of times the head and the medium are put in contact with each other inevitably increases, the probability that, for example, the head or the medium is damaged is high.

SUMMARY

It is an object of the present technique to provide a control unit for a storage unit that can reduce damage of a head or a medium.

According to an embodiment, the control unit measures first values of touchdown heater power at a first temperature set as temperature condition. And the control unit estimates second values of the touchdown heater power at a temperature other than the first temperature set on the measurement of the first values, on basis of a conversion equation.

And the control unit determines heater power setting values to adjust the spacing between the head and the storage medium, for each of the sub-areas, on the basis of the first values and the second values.

BRIEF DESCRIPTION OF THE DRAWINGS

FIG. 1 shows the outline and features of a magnetic disk unit according to a first embodiment;

FIG. 4 shows an exemplary heater setting value table according to the first embodiment;

FIG. 5 shows exemplary specifications set in the magnetic disk unit in a case where TDP values are estimated using a conversion equation;

FIG. 6 shows exemplary specifications set in the magnetic disk unit in a case where a base value in the conversion equation is minutely adjusted;

FIG. 9 shows exemplary specifications set in the magnetic disk unit in a case where TDP values are estimated by linear interpolation;

FIG. 10 shows exemplary specifications set regarding a method for correcting TDP values in the magnetic disk unit.

DESCRIPTION OF THE PREFERRED EMBODIMENTS

Figure 2A:
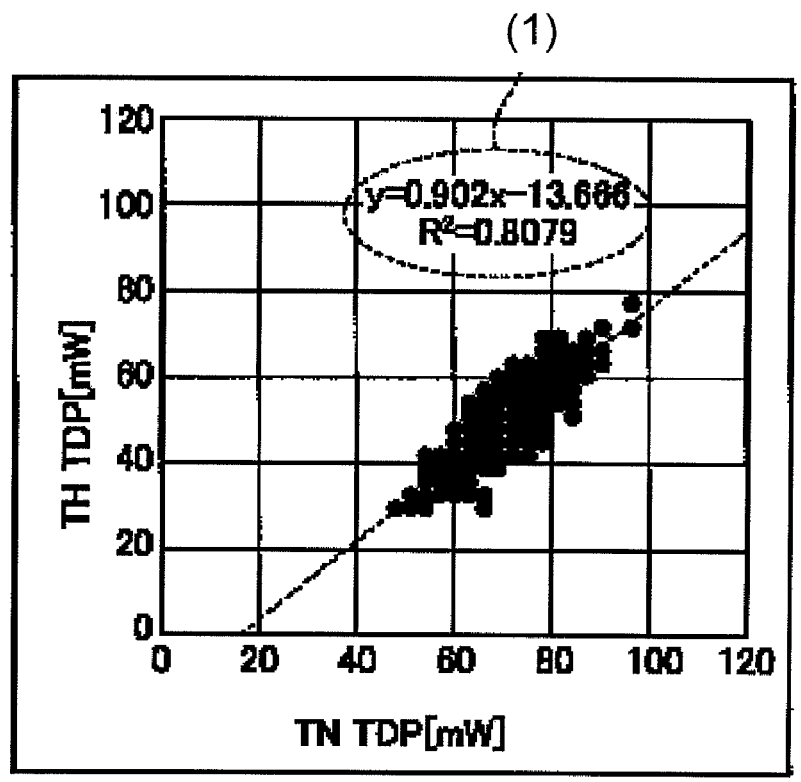
FIGS. 2A and 2B show the correlation between TDP measured at individual set temperatures.

Embodiments of a control unit, a storage unit, and a method for manufacturing the storage unit according to the present technique will now be described in detail with reference to the attached drawings. In the following description, the storage unit to which a heater setting value determining program is applied is first described as a first embodiment according to the present technique, and then other embodiments according to the present technique will be described.

First Embodiment

In the first embodiment, the outline, features, and components of and a process in a magnetic disk unit 1 as the storage unit according to the first embodiment will first be described in this order. Finally, advantageous effects achieved by the first embodiment will be described.

Outline and Features of Magnetic Disk Unit in the First Embodiment

The outline and features of the magnetic disk unit 1 according to the first embodiment will first be described by using FIG. 1. FIG. 1 shows the outline and features of the magnetic disk unit 1 according to the first embodiment.

In the magnetic disk unit 1 according to the first embodiment, adjustment of heater setting values is performed as a manufacturing process before a product is shipped from a factory to adjust a spacing for a heater so that the spacing between a head 14 including the heater and a storage medium 15 is set to a target spacing in design, as shown in FIG. 1.

The spacing in a state in which the heater is not driven is first measured after the heater is stopped. The head 14 protruded by the heater and the storage medium 15 are put in contact with each other to measure the spacing in a state in which the heater is stopped. Then, the touchdown heater power (hereinafter described as TDP where appropriate) that is an output value with which the head 14 and the storage medium 15 are in contact with each other is measured.

For each of the plurality of heads 14 included in the magnetic disk unit 1, touchdown heater powers with which the head 14 and the storage medium 15 are in contact with each other are measured during a read operation and a write operation at a temperature (for example, a normal temperature (TN): 30° C.) that is set as a temperature condition for adjusting the spacing for each head 14 for each of the sub-areas (for example, inner, center, and outer sub-areas) into which the area of the storage medium 15 is divided.

When a write element is operating in, for example, a write operation, the write element is a heating element because the write element includes a coil and thus partially functions as a heater. A read element does not function as a heater because the read element is a magnetoresistive (MR) element. Thus, heater setting values for measuring the spacing for a write operation and a read operation are different, and both of the heater setting values are measured.

In this case, the sub-areas are not limited to three sub-areas, i.e., inner, center, and outer sub-areas, and may further be divided. Moreover, precise control may be performed by, for example, linear interpolation or interpolation in which an approximate equation is used so as to further divide the three sub-areas into smaller zones (for example, thirty zones) in determination of heater setting values. In this arrangement, the heater can be accurately controlled, and thus the floating of the head 14 can be strictly controlled.

Moreover, the measurement may be performed by writing and reading predetermined data, using a specific test zone or an ordinary data zone in each of the sub-areas.

In the magnetic disk unit 1 according to the first embodiment, heater setting values for adjusting the spacing between the storage medium 15 and the head 14 are determined, as described above. In this case, the magnetic disk unit 1 according to the first embodiment is characterized mainly in that the probability that the head 14 or the storage medium 15 is damaged when heater setting values are determined can be reduced, as described below.

Specifically, in the magnetic disk unit 1 according to the first embodiment, first TDP values are measured at individual first temperatures set in the unit as temperature conditions for adjusting the spacing for each head 14, and, using conversion equations obtained from the correlation between second TDP values measured at the individual first set temperatures and the first TDP values, third TDP values at set temperatures other than the individual first set temperatures are estimated.

Figure 2B:
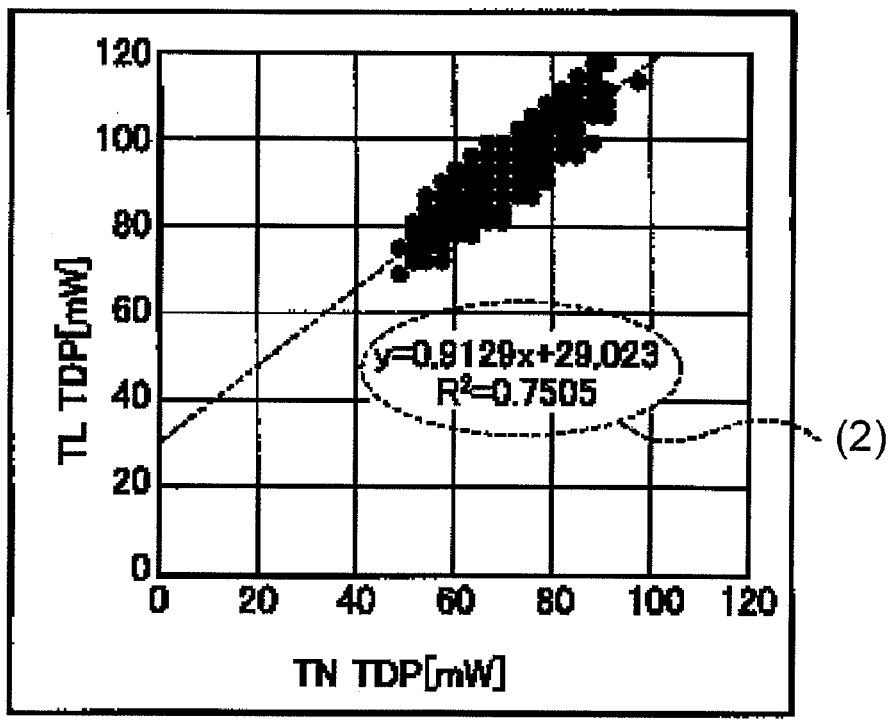

In this case, the conversion equations based on the correlation between the second TDP values are obtained by, for example, properly changing the head 14, the sub-area of the storage medium 15, and the set temperature, as shown in FIGS. 2A and 2B. For example, the conversion equations are obtained by analyzing the TDP values of 874 samples. In the second TDP values, a correlation can be obtained, in which, regardless of the type of a corresponding head, the sub-area of the storage medium 15, and the like, the ratio of the amount of change in the TDP value measured at a low temperature (TL) to the amount of change in the TDP value measured at the normal temperature (TN) and the ratio of the amount of change in the TDP value measured at the normal temperature (TN) to the amount of change in the TDP value measured at a high temperature (TH) are constant, as shown in FIGS. 2A and 2B.

A conversion equation obtained from the correlation between the TDP values measured at the high set temperature (TH) and the TDP values measured at the normal set temperature (TN) is $y=0.902x-13.666$ (a base value), as shown (1) in FIG. 2A. Moreover, a conversion equation obtained from the correlation between the TDP values measured at the normal set temperature (TN) and the TDP values measured at the low set temperature (TL) is $y=0.9129x+29.023$, as shown (2) in FIG. 2B.

Thus, for example, regarding a certain head, for each of the sub-areas (for example, inner, center, and outer sub-areas) of the storage medium 15, TDP values at the high temperature (TH) and the low temperature (TL) can be estimated, using the TDP values measured at the normal temperature (TN): 30° C. and the aforementioned conversion equations, as shown in FIG. 1

After the TDP values are estimated, the magnetic disk unit 1 according to the first embodiment determines heater setting values, using the actually measured TDP values (for example, the TDP values measured at the normal set temperature (TN) for the sub-areas of the storage medium 15) and the estimated TDP values (the TDP values estimated at the high set temperature (TH) and the low set temperature (TL) for the sub-areas of the storage medium 15).

That is to say, there is a high correlation between TDP values obtained from a plurality of samples across temperatures, as shown in FIGS. 2A and 2B. Thus, highly reliable TDP values can be estimated using conversion equations based on the correlation, and highly reliable heater setting values can be obtained.

For example, for each of the sub-areas (for example, inner, center, and outer sub-areas), into which the area of the storage medium 15 is divided, and each of the set temperatures, a value obtained by subtracting a predetermined value from the TDP value is determined as being a heater setting value such that a predetermined distance between the storage medium 15 and the head 14 is kept. A table that contains heater setting values determined in this way is created and stored in a memory in the unit. The expansion of the head 14 due to a write current is considered in determination of heater setting values using TDP values during a write operation.

In the magnetic disk unit 1 according to the first embodiment, when heater setting values are determined using TDP values, not only the time necessary to measure TDPs but also the number of times the head 14 and the storage medium 15 are put in contact with each other can be reduced, as described in the foregoing description of the main features of the magnetic disk unit 1. Thus, the probability that the head 14 or the storage medium 15 is damaged can be reduced.

Components of Magnetic Disk Unit

First Embodiment

Figure 3:
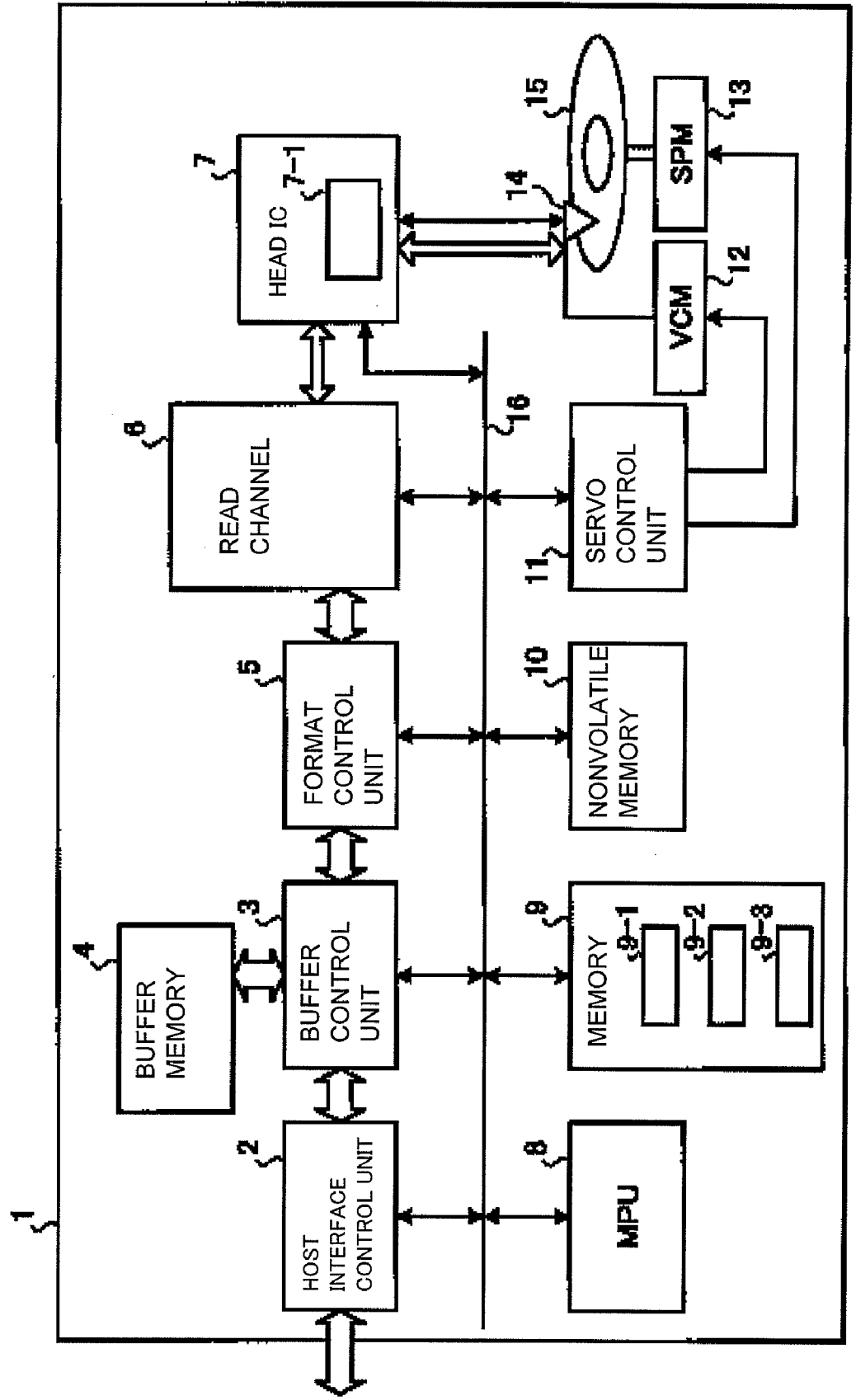
FIG. 3 is a block diagram showing the components of the magnetic disk unit according to the first embodiment.

The components of the magnetic disk unit 1 according to the first embodiment will now be described using FIG. 3. FIG. 3 is a block diagram showing the components of the magnetic disk unit 1 according to the first embodiment. The magnetic disk unit 1 includes a host interface (IF) control unit 2, a buffer control unit 3, a buffer memory 4, a format control unit 5, a read channel 6, a head integrated circuit (IC) 7, a microprocessing unit (MPU) 8, a memory 9, a nonvolatile memory 10, a servo control unit 11, a voice coil motor (VCM) 12, a spindle motor (SPM) 13, heads 14, a storage medium 15, and a thermometer (not shown), and predetermined ones of the components are connected to each other via a common bus 16, as shown in FIG. 3.

The main components of the magnetic disk unit 1 according to the first embodiment will now be briefly described. The host IF control unit 2 controls communications of, for example, various types of information exchanged with an external unit such as a host. The buffer control unit 3 controls the buffer capacity of the buffer memory 4. The buffer memory 4 temporarily stores, for example, information exchanged with an external unit such as a host via the host IF control unit 2. The format control unit 5 controls reading of digital data received from the read channel 6 when reading the data by, for example, checking errors of the data. The read channel 6 generates digital data by processing signals from the heads 14 received from the head IC 7 when data is read.

The head IC 7 controls the output from a heater included in each of the heads 14 under the control of the MPU 8. The MPU 8 performs main control of the magnetic disk unit 1. The memory 9 and the nonvolatile memory 10 store, for example, control data and a control program. The servo control unit 11 controls the operations of the VCM 12 and the SPM 13. The heads 14 each include a write element, a read element, and a heater and perform read and write operations on the storage medium 15. The storage medium 15 is formed by depositing, for example, a magnetic film on a metal or glass circular plate, and predetermined data is recorded on the storage area of the storage medium 15.

The head IC 7, the MPU 8, and the memory 9 closely relate to the present technique. Specifically, the head IC 7 controls the spacing for each of the heads 14 by controlling the output from a heater included in each of the heads 14 on the basis of heater setting values received from the MPU 8.

The memory 9 is the magnetic disk unit 1 that stores, for example, control data and a control program necessary for various types of processing by the MPU 8. Specifically, the memory 9 stores a heater setting value determining program 9-1, TDP value data 9-2, and a heater setting value table 9-3.

The heater setting value determining program 9-1 is a program in which the procedure of heater setting value determination by the MPU 8 is defined. The TDP value data 9-2 includes, for example, TDP values measured in heater setting value determination by the MPU 8 and estimated TDP values. FIG. 4 shows an example of the heater setting value table 9-3. The heater setting value table 9-3 stores a heater setting value determined by the MPU 8 for each of the sub-areas (for example, inner, center, and outer sub-areas) into which the area of the storage medium 15 is divided and each temperature in the unit. In this case, heater setting values for a write operation and heater setting values for a read operation are stored in the heater setting value table 9-3 for each of the heads 14.

The MPU 8 determines heater setting values by reading the heater setting value determining program 9-1 from the memory 9. Specifically, for each of the heads 14, the MPU 8 measures TDP values with which each of the heads 14 and the storage medium 15 are in contact with each other during a read operation and a write operation at a temperature (for example, the normal temperature (TN): 30° C.) that is set as a temperature condition for adjusting the floating of each of the heads 14 for each of the sub-areas (for example, inner, center, and outer sub-areas), into which the area of the storage medium 15 is divided. In particular, for each of the sub-areas of the storage medium 15, the MPU 8 measures first TDP values with which each of the heads 14 and the storage medium 15 are actually in contact with each other at a first temperature that is set in the unit as a temperature condition, while causing the head IC 7 to activate a heater in each of the heads 14.

Then, using conversion equations (refer to FIGS. 2A and 2B) obtained from the correlation between second TDP values measured in advance at the first set temperature and the first TDP values, the MPU 8 estimates third TDP values at set temperatures other than the first set temperature for each of the sub-areas of the storage medium 15. In the second TDP values, a correlation can be obtained, in which, regardless of the type of a corresponding head, the sub-area of the storage medium 15, and the like, the ratio of the amount of change in the TDP value measured at the low temperature (TL) to the amount of change in the TDP value measured at the normal temperature (TN) and the ratio of the amount of change in the TDP value measured at the normal temperature (TN) to the amount of change in the TDP value measured at the high temperature (TH) are constant, as shown in FIGS. 2A and 2B.

Thus, the third TDP values at the set temperatures other than the first set temperature are estimated for each of the sub-areas of the storage medium 15, using the conversion equations obtained from the correlation.

The conversion equation obtained from the correlation between the TDP values measured at the high set temperature (TH) and the TDP values measured at the normal set temperature (TN) is $y=0.902x-13.666$ (a base value), as shown (1) in FIG. 2A. Similarly, the conversion equation obtained from the correlation between the TDP values measured at the normal set temperature (TN) and the TDP values measured at the low set temperature (TL) is $y=0.9129x+29.023$, as shown (2) in FIG. 2B.

For example, regarding a certain one of the heads 14, for each of the sub-areas (for example, inner, center, and outer sub-areas) of the storage medium 15, the MPU 8 estimates TDP values at the high temperature (TH) and the low temperature (TL), using the TDP values measured at the normal temperature (TN): 30° C. and the aforementioned conversion equations. Then, for example, for each of the sub-areas of the storage medium 15, the MPU 8 stores the TDP values measured at the normal temperature (TN): 30° C. and the estimated TDP values at the high temperature (TH) and the low temperature (TL) in the memory 9 as the TDP value data 9-2.

FIG. 5 shows exemplary specifications set in the magnetic disk unit 1 in a case where TDP values are estimated using a conversion equation. FIG. 6 shows exemplary specifications set in the magnetic disk unit 1 in a case where the base value in the conversion equation shown in FIGS. 2A and 2B is minutely adjusted.

After the TDP values are estimated, the MPU 8 reads the TDP value data 9-2 from the memory 9 and determines heater setting values, using the actually measured TDP values (for example, the TDP values measured at the normal set temperature (TN) for each of the sub-areas of the storage medium 15) and the estimated TDP values (the TDP values estimated at the high set temperature (TH) and the low set temperature (TL) for each of the sub-areas of the storage medium 15).

For example, for each of the sub-areas, into which the area of the storage medium 15 is divided, and each of the set temperatures, the MPU 8 determines a value obtained by subtracting a predetermined value from the TDP value as being a heater setting value such that a predetermined distance between the storage medium 15 and each of the heads 14 is kept. Then, assuming that the individual set temperatures are temperatures in the unit, the heater setting value table 9-3 (refer to FIG. 4), which contains heater setting values each of which is determined for each of the sub-areas of the storage medium 15 and each of the temperatures in the unit, is created and stored in the memory 9. The effects of the expansion of each of the heads 14 due to a write current are considered in determination of heater setting values using TDP values during a write operation. Moreover, for each of the heads 14, a heater setting value table for a write operation and a heater setting value table for a read operation are separately created.

For example, heater setting values are obtained by the following equations: a read heater power $Pwr=TDP+a\cdot BV+b$, where a is a compensation factor, and BV is spacing between the storage medium 15 and the head 14, and b is another adjustment value; and a write heater power $Pww=TDP+c\cdot BV+d\cdot Iw+e$, where c is a compensation factor, $d\cdot Iw$ is an adjustment value for a write operation, and e is another adjustment value.

The heater setting value tables may be created by obtaining heater setting values after dividing the three sub-areas into, for example, thirty zones by further performing, for example, approximation on the heater setting values obtained in the aforementioned manner.

Finally, the heater setting value tables created in the aforementioned manner are stored (for example, a storage medium 15 or a nonvolatile memory 10) in the magnetic disk unit 1 as the initial values of read heater powers and write heater powers during a normal operation.

Process in Magnetic Disk Unit

First Embodiment

Figure 7:
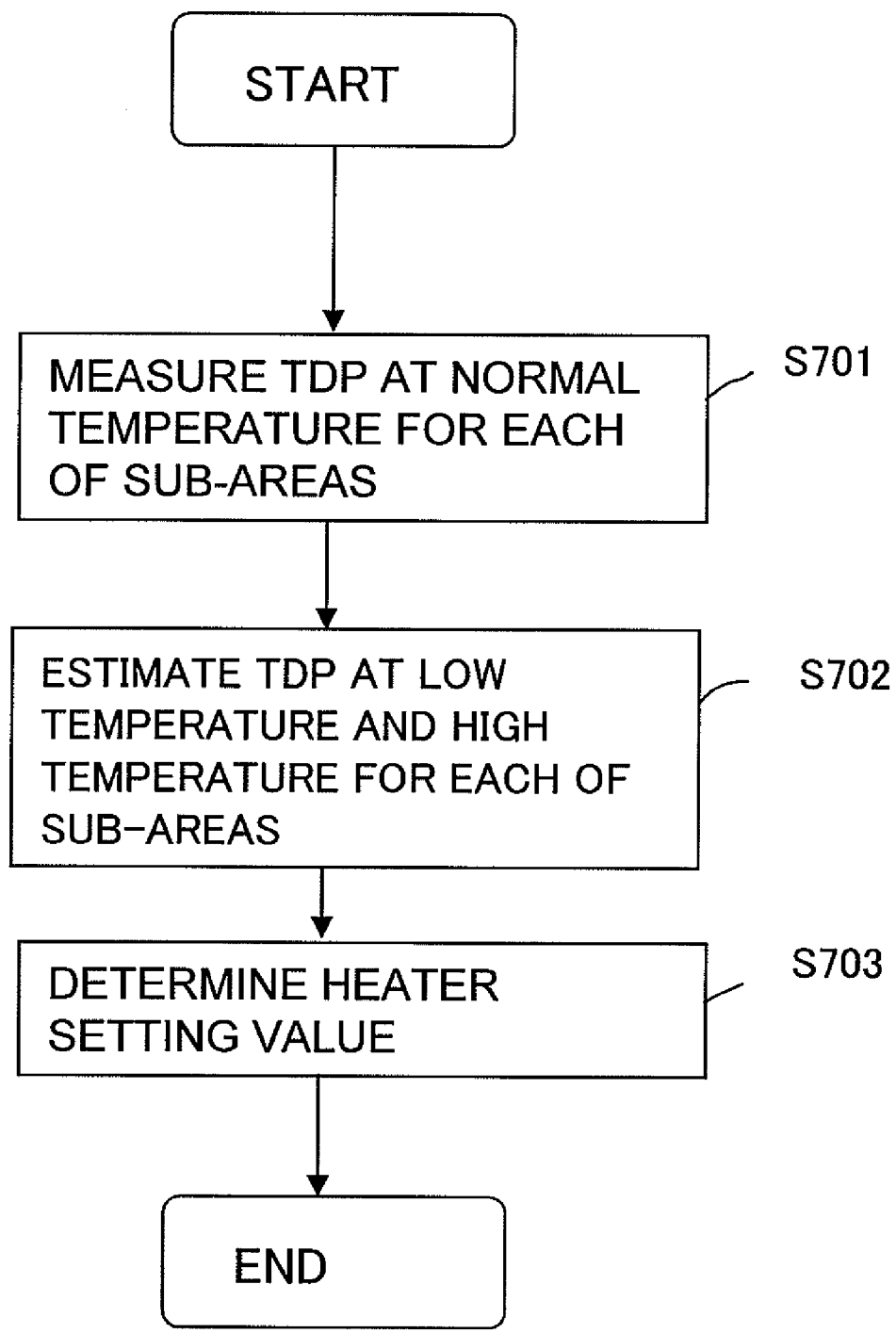
FIG. 7 is a flowchart showing the flow of a process in the magnetic disk unit according to the first embodiment.

The process in the magnetic disk unit 1 according to the first embodiment will now be described using FIG. 7. FIG. 7 is a flowchart showing the flow of the process in the magnetic disk unit 1 according to the first embodiment.

In step S701, for each of the heads 14, the MPU 8 in the magnetic disk unit 1 measures first TDP values with which each of the heads 14 and the storage medium 15 are in contact with each other at a first temperature (for example, the normal temperature (TN): 30° C.) that is set as a temperature condition for adjusting the spacing for each of the heads 14 for each of the sub-areas (for example, inner, center, and outer sub-areas), into which the area of the storage medium 15 is divided, as shown in FIG. 7.

Then, in step S702, using conversion equations (refer to FIGS. 2A and 2B) obtained from the correlation between second TDP values measured in advance at the first set temperature and the first TDP values, the MPU 8 estimates third TDP values at set temperatures other than the first set temperature.

Specifically, for example, regarding a certain one of the heads 14, for each of the sub-areas (for example, inner, center, and outer sub-areas) of the storage medium 15, the MPU 8 estimates TDP values at the high temperature (TH) and the low temperature (TL), using the TDP values measured at the normal temperature (TN): 30° C. and the aforementioned conversion equations. Then, for example as shown in FIG. 1, for each of the sub-areas of the storage medium 15, the MPU 8 stores the TDP values measured at the normal temperature (TN): 30° C. and the estimated TDP values at the high temperature (TH) and the low temperature (TL) in the memory 9 as the TDP value data 9-2.

After the third TDP values are estimated, in step S703, the MPU 8 reads the TDP value data 9-2 from the memory 9 and determines heater setting values, using the first TDP values (for example, TDP values measured at the normal set temperature (TN) for each of the sub-areas of the storage medium 15) and the third TDP values (TDP values estimated at the high set temperature (TH) and the low set temperature (TL) for each of the sub-areas of the storage medium 15).

For example, for each of the sub-areas, into which the area of the storage medium 15 is divided, and each of the set temperatures, the MPU 8 determines a value obtained by subtracting a predetermined value from the TDP value as being a heater setting value such that a predetermined distance between the storage medium 15 and each of the heads 14 is kept. Then, replacing the individual set temperatures with temperatures in the unit, the heater setting value table 9-3 (refer to FIG. 4), which contains heater setting values each of which corresponding to each of the sub-areas of the storage medium 15 and each of the temperatures in the unit, is created and stored in the memory 9.

Advantageous Effects Achieved by First Embodiment

As described above, in the first embodiment, for each of the sub-areas of a storage medium 15, a first TDP value with which each head 14 and the storage medium 15 are in contact with each other is measured at at least one temperature (for example, the normal set temperature (TN) that is a reference temperature, such as a room temperature) set as a temperature condition for adjusting the spacing for each head 14, and, using a conversion equation obtained from the correlation between second TDP values measured in advance at the at least one set temperature and the first TDP values, third TDP values at set temperatures (for example, the high set temperature (TH) and the low set temperature (TL)) other than the at least one set temperature are estimated. Then, heater setting values are determined using the first TDP values and the third TDP values. Thus, when heater setting values are determined using TDP values, not only the time necessary to measure TDP values but also the number of times the head 14 and the storage medium 15 are put in contact with each other can be reduced. Accordingly, the probability that the head 14 or the storage medium 15 is damaged can be reduced.

While a case where TDP values at the high temperature (TH) and the low temperature (TL) are estimated for each of the sub-areas of a storage medium 15, using TDP values measured at the normal temperature (TN): 30° C. and the aforementioned conversion equations, has been described in the first embodiment, the present technique is not limited to the case and can be implemented by properly changing the number of TDP values that are actually measured.

Second Embodiment

While the first embodiment of the present technique has been described, the present technique may be implemented in various embodiments other than the first embodiment. The other embodiments of the present technique will now be described.

(1) Estimating TDP Values at Other Set Temperatures by Linear Interpolation

In the first embodiment, a case is described where, using conversion equations obtained from the correlation between TDP values measured in advance at individual set temperatures and TDP values that are actually measured, TDP values at set temperatures other than set temperatures at which the TDP values are actually measured are estimated. However, the present technique is not limited to the case.

Specifically, the MPU 8 may measure fourth TDP values at at least two set temperatures for each of the sub-areas (for example, inner, center, and outer sub-areas) of the storage medium 15 and perform linear interpolation in which the correlation between sixth TDP values measured in advance across the at least two set temperatures is used to estimate fifth TDP values at set temperatures other than the at least two set temperatures.

Figure 8:
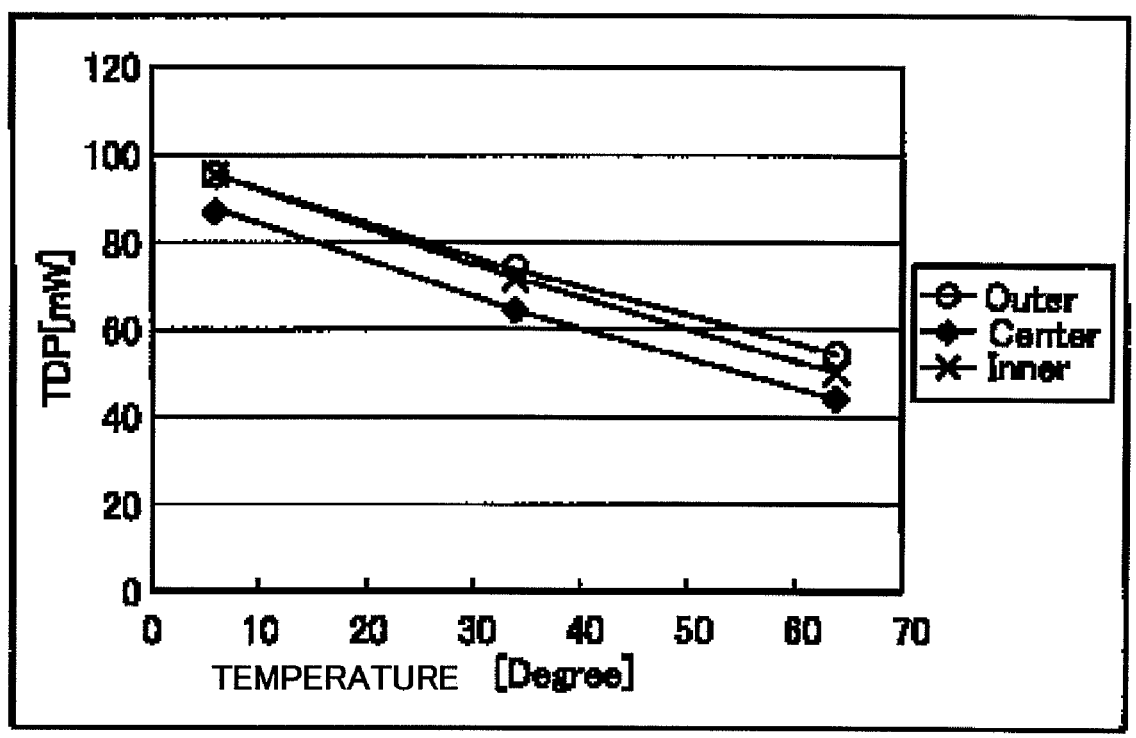
FIG. 8 shows the correlation between the temperature in the unit and the TDP value.

For example, for a certain one of the heads 14, the MPU 8 performs linear interpolation based on the correlation obtained by analyzing the TDP values (or the average value of TDP values) of, for example, 280 samples measured at two of the low, normal, and high set temperatures while properly changing the head 14, the sub-area of the storage medium 15, and the set temperature to calculate TDP values at another set temperature for each of the sub-areas of the storage medium 15, as shown in FIG. 8.

FIG. 9 shows exemplary specifications set in the magnetic disk unit 1 in a case where TDP values are estimated by linear interpolation. When, for example, a TDP value that is actually measured at the high temperature, out of TDP values that are actually measured at individual temperatures, is erroneously detected, the erroneously detected TDP value at the high temperature may be corrected using a TDP value estimated by linear interpolation from TDP values that are actually measured at the low and normal temperatures and a TDP value estimated by the conversion equations described in the first embodiment. FIG. 10 shows exemplary specifications set regarding a method for correcting TDP values in the magnetic disk unit 1.

The MPU 8 determines heater setting values using TDP values obtained in this way, as in the first embodiment.

In this arrangement, for each of the sub-areas of the storage medium 15, fourth TDP values are measured at least two temperatures (two of the low, normal, and high set temperatures) set as temperature conditions, and linear interpolation based on the correlation between sixth TDP values measured in advance across the at least two set temperatures is performed to estimate fifth TDP values at set temperatures other than the at least two set temperatures. Then, heater setting values are determined using the fourth TDP values and the fifth TDP values. Thus, the number of times each of the heads 14 and the storage medium 15 are put in contact with each other can be reduced as much as possible, thereby reducing the probability that each of the heads 14 or the storage medium 15 is damaged.

TDP values may be estimated by both the conversion equations described in the first embodiment and the aforementioned linear interpolation in a manner that depends on the number of TDP values that are actually measured.

(2) Estimating TDP Values that Cannot be Actually Measured

Moreover, in the first embodiment, for each of the sub-areas of the storage medium 15, TDP values may be measured at all temperatures set as temperature conditions, and TDP values that cannot be measured may be estimated by the conversion equations obtained from the correlation between TDP values measured in advance at the individual set temperatures and/or linear interpolation based on the correlation between TDP values measured in advance across the individual set temperatures.

The purpose of this arrangement is to achieve accuracy although the number of touchdowns increases. In this case, when a heater setting value obtained from an actually measured TDP has a large error and when the actually measured TDP may be erroneously measured, the heater setting value is obtained from an estimated TDP. In this manner, re-touchdown can be avoided, and a more accurate heater setting value can be obtained using a highly correlated estimated TDP.

Accordingly, TDP values that cannot be measured can be obtained, and heater setting values for the sub-areas of the storage medium 15 for a corresponding one of the heads 14 can be obtained.

(3) Controlling Heater Setting Value Determination from External Unit

Figure 11:
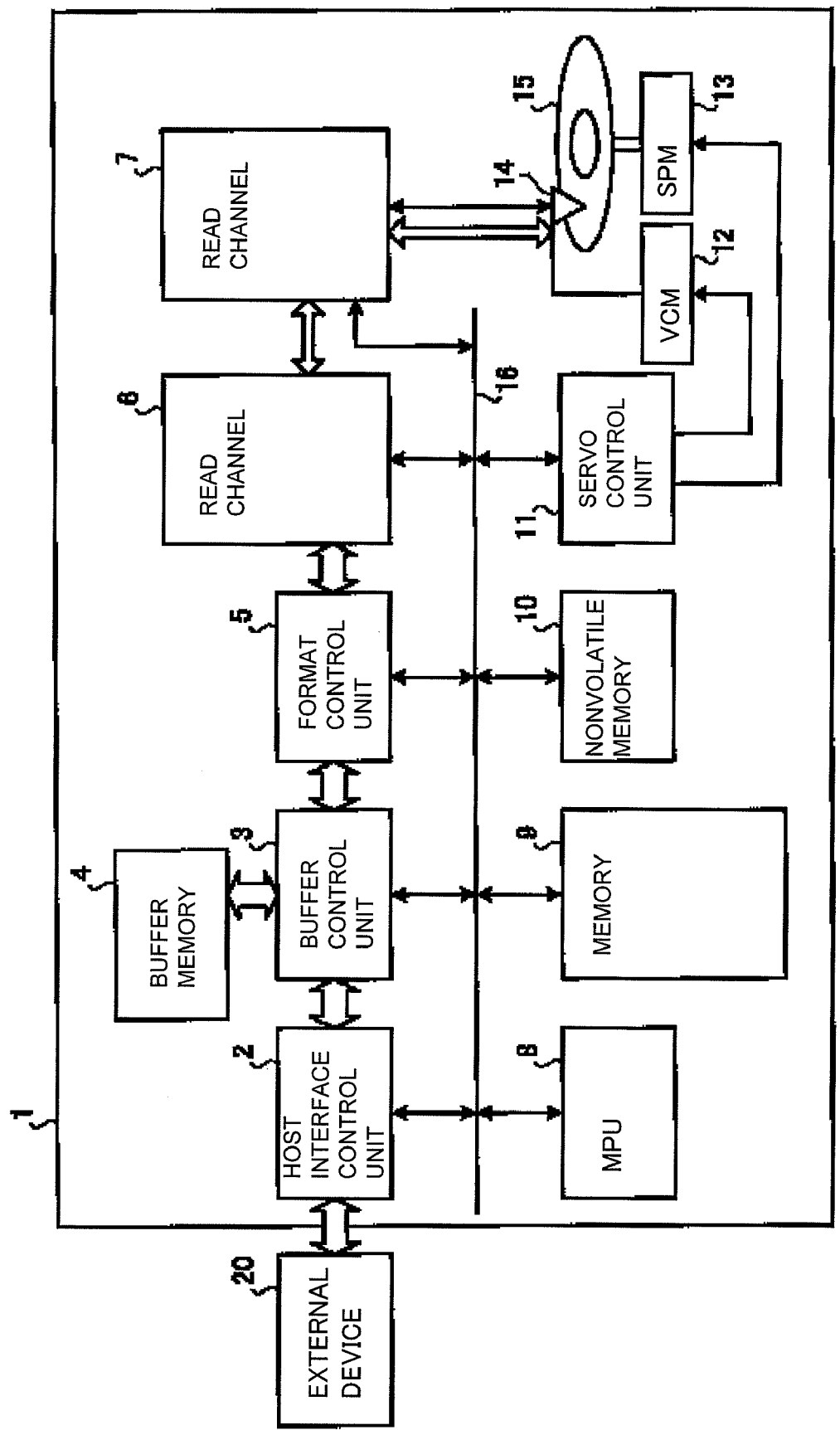
FIG. 11 is a block diagram showing the components of a magnetic disk unit according to a second embodiment.

For example, an external unit in, for example, a manufacturing facility or an evaluation facility, may access the MPU 8 via the host IF control unit 2, as shown in FIG. 11, and control heater setting value determination described in the first embodiment.

Accordingly, heater setting values can be set in a magnetic disk unit 1, using an external unit that includes a function of determining heater setting values, without the function of determining heater setting values provided in the magnetic disk unit 1.

(4) Components

The components of the magnetic disk unit 1 shown in FIG. 3 represent functional components and do not necessarily represent physical components. The specific way in which the components of the magnetic disk unit 1 are distributed or integrated is not limited to that shown in the drawing. All or some of the components may be functionally or physically distributed or integrated into various units in a manner that depends on various conditions, for example, the load and the usage. For example, a single the magnetic disk unit 1 into which the memory 9 and the nonvolatile memory 10 are integrated may be provided. Moreover, all or some of processing functions (heater setting value determination) performed by the MPU 8 in the magnetic disk unit 1 may be implemented via a program that is analyzed and executed by the MPU 8, a memory control unit (MCU), or a central processing unit (CPU), or hardware in which wired logic is used. The present technique can be applied to not only magnetic disk units but also, for example, thermomagnetic memories and magneto-optical storage memories.

What is claimed is:

1. A control unit for adjusting spacing between a head with a heater and a storage medium of a storage unit by controlling power of the heater, the storage medium being divided into a plurality of sub-areas, said control unit comprising:
    a processor to control the control unit according to a process including:
    measuring first values of touchdown heater power upon the head coming in contact with the storage medium at at least one temperature set as a temperature condition for adjusting the spacing, for each of the sub-areas;
    estimating second values of the touchdown heater power at a second temperature other than the first temperature set on the measurement of the first values, on the basis of a conversion equation obtained from correlation between third values of the touchdown heater power measured in advance at the first temperature and the second temperature, for each of the sub-areas, the conversion equation converting a touchdown heater power at the first temperature to a touchdown heater power at the second temperature; and
    determining heater power setting values for adjusting the spacing between the head and the storage medium, for each of the sub-areas, by using the first values and the second values.

2. The control unit according to claim 1, wherein, for each of the sub-areas, fourth values of the touchdown heater power are measured at at least two temperatures set as the temperature condition, fifth values of the touchdown heater power at a temperature other than said at least two set temperatures are estimated by linear interpolation on the basis of correlation between the fourth values of the touchdown heater power measured, and the heater power setting values are determined by using the fourth values and the fifth values.

3. The control unit according to claim 2, wherein, for each of the sub-areas, sixth values of the touchdown heater power are measured at all temperatures set as the temperature condition, and a value of the touchdown heater power that is not measured is estimated by at least one of the conversion equation and the linear interpolation.

4. A storage unit comprising:
a storage medium divided into plural sub-areas;
a head with a heater;
a control unit for adjusting the spacing between the head and the storage medium by controlling power of the heater, said control unit including:
a processor to control the control unit according to a process including:
measuring first values of touchdown heater power upon the head coming in contact with the storage medium at at least one temperature set as a temperature condition for adjusting the spacing, for each of the sub-areas;
estimating second values of the touchdown heater power at a second temperature other than the first temperature set on the measurement of the first values, on the basis of a conversion equation obtained from correlation between third values of the touchdown heater power measured in advance at the first temperature and the second temperature, for each of the sub-areas, the conversion equation converting a touchdown heater power at the first temperature to a touchdown heater power at the second temperature; and
determining heater power setting values for adjusting the spacing between the head and the storage medium, for each of the sub-areas, by using the first values and the second values.

5. The storage unit according to claim 4, wherein, for each of the sub-areas, fourth values of the touchdown heater power are measured at at least two temperatures set as the temperature condition, fifth values of the touchdown heater power at a temperature other than said at least two set temperatures are estimated by linear interpolation on the basis of correlation between the fourth values of the touchdown heater power measured, and the heater power setting values are determined by using the fourth values and the fifth values.

6. The storage unit according to claim 5, wherein, for each of the sub-areas, sixth values of the touchdown heater power are measured at all temperatures set as the temperature condition, and a value of the touchdown heater power that is not measured is estimated by at least one of the conversion equation and the linear interpolation.

7. A method for manufacturing a storage unit including a storage medium and a head with a heater for adjusting the spacing between the head and the storage medium, the storage medium being divided into a plurality of sub-areas, comprising the steps of:
measuring first values of touchdown heater power upon the head coming in contact with the storage medium at at least one temperature set as a temperature condition for adjusting the spacing, for each of the sub-areas;
estimating second values of the touchdown heater power at a second temperature other than the first temperature set on the measurement of the first values, on the basis of a conversion equation obtained from correlation between third values of the touchdown heater power measured in advance at the first temperature and the second temperature, for each of the sub-areas, the conversion equation converting a touchdown heater power at the first temperature to a touchdown heater power at the second temperature; and
determining heater power setting values for adjusting the spacing between the head and the storage medium, for each of the sub-areas, by using the first values and the second values.

8. The method for manufacturing a storage unit according to claim 7, wherein, for each of the sub-areas, fourth values of the touchdown heater power are measured at at least two temperatures set as the temperature condition, fifth values of the touchdown heater power at a temperature other than said at least two set temperatures are estimated by linear interpolation on the basis of correlation between the fourth values of the touchdown heater power measured, and the heater power setting values are determined by using the fourth values and the fifth values.

9. The method for manufacturing a storage unit according to claim 8, wherein, for each of the sub-areas, sixth values of the touchdown heater power are measured at all temperatures set as the temperature condition, and a value of the touchdown heater power that is not measured is estimated by at least one of the conversion equation and the linear interpolation.

* * * * *